E. J. JACKSON.
SELF OILING VEHICLE SPRING.
APPLICATION FILED MAR. 11, 1918. RENEWED DEC. 9, 1919.
1,343,453.
Patented June 15, 1920.
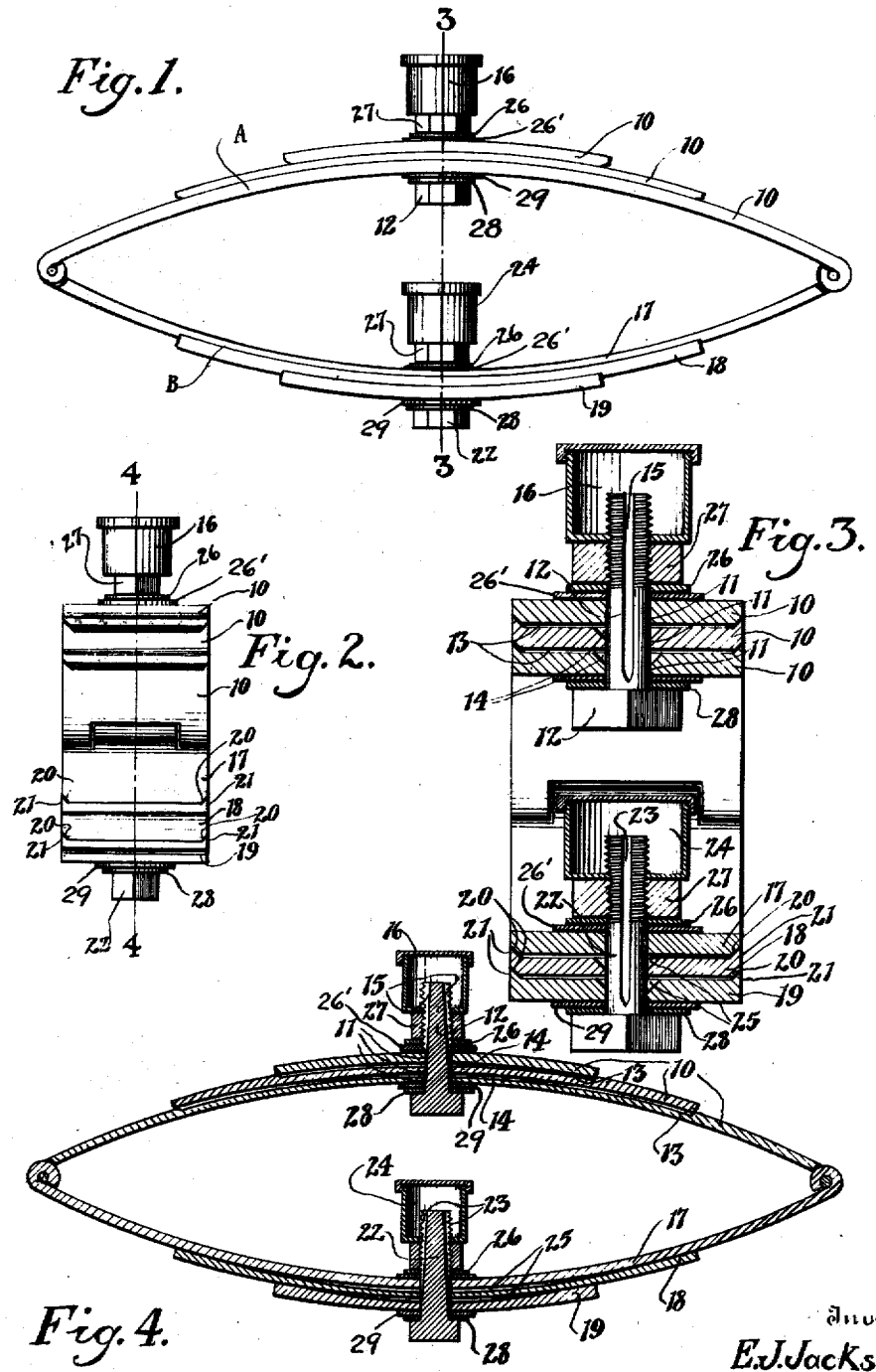
Witnesses.
Wm. F. Kendrick.
N. M. Test.
Inventor
E. J. Jackson.
By 
Attorneys.

UNITED STATES PATENT OFFICE.

EDWARD J. JACKSON, OF WILLCOX, ARIZONA.

SELF-OILING VEHICLE-SPRING.

1,343,453.   Specification of Letters Patent.   Patented June 15, 1920.

Application filed March 11, 1918, Serial No. 221,769. Renewed December 9, 1919. Serial No. 343,642.

*To all whom it may concern:*

Be it known that I, EDWARD J. JACKSON, a citizen of the United States, residing at Willcox, in the county of Cochise, State of Arizona, have invented certain new and useful Improvements in Self-Oiling Vehicle-Springs; and I do hereby declare the following to be a full, clear, and exact description of the invention, such as will enable others skilled in the art to which it appertains to make and use the same.

This invention relates to improvements in springs and particularly to vehicle springs.

One object of the present invention is to provide a novel and efficient means for oiling the laminated steel springs used on automobiles, wagons, and like vehicles.

Another object of the invention is to provide a spring made up of a plurality of leaves each of which is formed to receive and distribute oil to all of the frictionally contacting parts thereof.

Other objects and advantages will be apparent from the following description when taken in connection with the accompanying drawing.

In the drawing:

Figure 1 is a front elevation of an elliptical vehicle spring made in accordance with my invention.

Fig. 2 is an end view of the same.

Fig. 3 is an enlarged vertical sectional view taken on the line 3—3 of Fig. 1.

Fig. 4 is an enlarged vertical longitudinal sectional view taken on the line 4—4 of Fig. 2.

Referring particularly to the accompanying drawing, A and B represent, respectively the upper and lower halves of the elliptical vehicle spring. In the upper half A, 10 represents a plurality of longitudinally arched and superimposed leaves. Formed vertically through the centers of the leaves are the openings 11, and disposed through these openings is a bolt 12. In the upper face of each of the two lower leaves of the section or half A of the spring, and extending longitudinally and centrally thereof, is a groove 13, the same being comparatively wide at its center and tapering toward both ends. Centrally in the bottoms of the grooves 13 of the said two lower leaves, and extending longitudinally thereof, are the grooves 14. Formed in the opposite sides of the bolt 12, and extending longitudinally thereof, are the grooves 15 for conveying oil from the oil cup 16 to the grooves of the spring leaves. This oil cup is removably engaged on the upper or threaded end of the bolt. The sides of the leaves 10 are beveled as shown.

The lower member of the spring, includes three superimposed leaves 17, 18, and 19, respectively. The sides or longer edges of the lower faces of the leaves 17 and 18 are beveled, as shown at 20, and rest against the correspondingly beveled inner faces of the vertical side flanges 21 formed on the intermediate portions of the sides of the leaves 18 and 19. Thus the leaves are held in proper position for longitudinal slidable movement with respect to each other but are prevented from lateral or sidewise movement. It will be noted that these flanges 21 terminate at the ends of the leaves on which they are formed.

A bolt 22 is disposed vertically through the centers of the leaves 17, 18, and 19, and also has the oil conveying grooves 23, for delivering oil from the oil cup 24 to the grooves 25, formed in the upper faces of the leaves 18 and 19.

On each of the bolts 12 and 22, between the oil cups and the uppermost of the leaves of the upper and lower sections A and B, are engaged the washer plates 26, gaskets 26', and the clamping nuts 27. On the bolts, between the lowermost leaves and the heads of the bolts, are disposed the washer plates 28, and the gaskets 29.

It will be noted that the grooves of the bolts are disposed in positions to deliver oil to the inner or central portions of the grooves of the leaves, the grooves of the bolts extending upwardly into the cups, so that the oil will properly flow therethrough.

It will also be noted that the beveled edges of the leaves, where they engage with the beveled faces of the leaves next below, are supported at such a height that a space is formed between each pair of leaves for the reception of the oil, thus permitting the oil to spread out and properly and effectively lubricate the different leaves, whereby the free and efficient operation of the leaves is assured.

The showing of the bolts and oil cups is to an exaggeration for purpose of clearness in the presentation thereof. The device, when placed on the market, will have considerably smaller bolts and oil cups so that the upper and lower sections of the spring can move toward and away from each other without interference of the inner or lower cup 24.

There is thus provided a vehicle spring wherein the oiling is automatic and effective.

What is claimed is:

1. A vehicle spring including a plurality of superimposed leaves, said leaves being formed with interfitting beveled marginal portions, said leaves except the uppermost one being formed with longitudinal central grooves which are wide at their central portions and taper toward both ends, all of the leaves being formed with central vertically alining openings, a longitudinally grooved bolt disposed through the openings, and an oil cup on the upper end of the bolt, the grooves of the bolt being arranged in position to deliver oil to the grooves of the leaves.

2. A vehicle spring including superimposed and subimposed leaves having vertically alining central openings, each upper face of the subimposed leaf being formed with a longitudinal groove terminating short of the ends thereof, the side and end walls of which groove are inwardly beveled, each superimposed leaf having its side and end edges beveled to engage with said beveled walls, each subimposed leaf having also a longitudinal oppositely tapering groove therein in the bottom of its first described groove, and means for conveying lubricants through the alining openings of the leaves to the grooves.

3. A vehicle spring including mutually engaged leaves, one of said leaves being provided with a groove, the side and end walls of which are beveled to converge inwardly, the other of said leaves having its side and end edges beveled correspondingly to the groove walls, and engaged therewith, and means for conveying lubricants to the grooves.

In testimony whereof, I affix my signature in the presence of two witnesses.

EDWARD J. JACKSON.

Witnesses:
 JAMES R. McKAY,
 RUBY F. FROHMANN.